Figure 11:
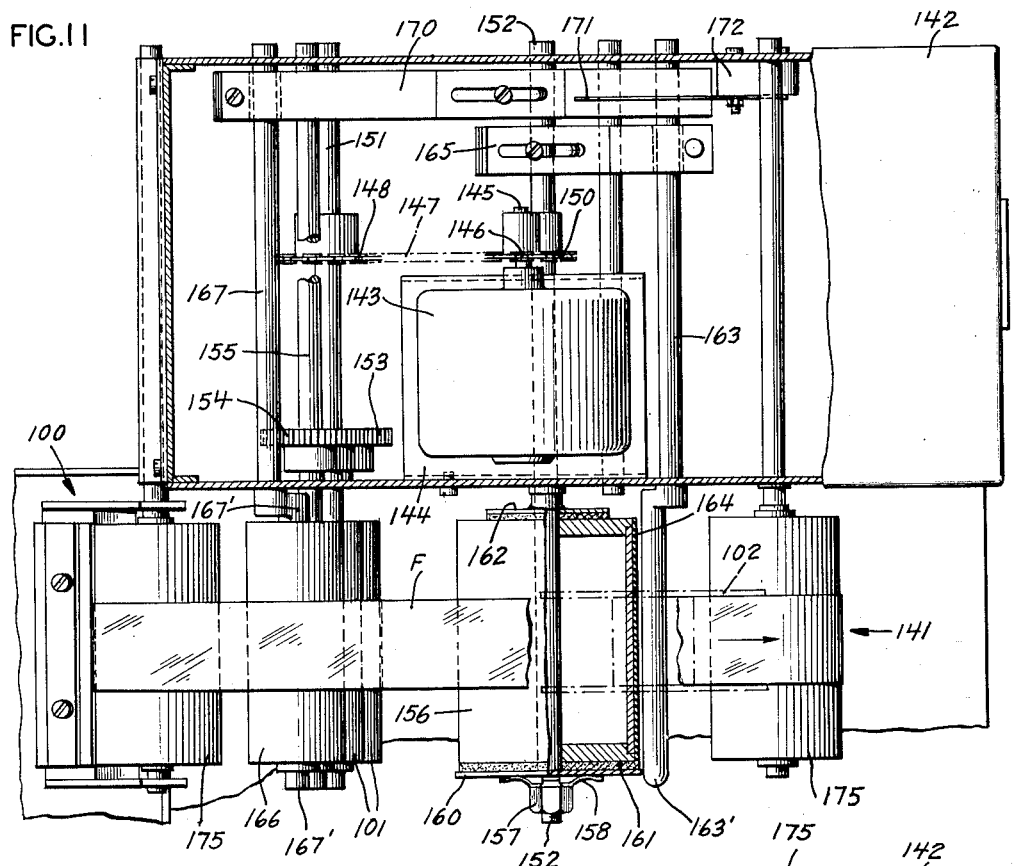

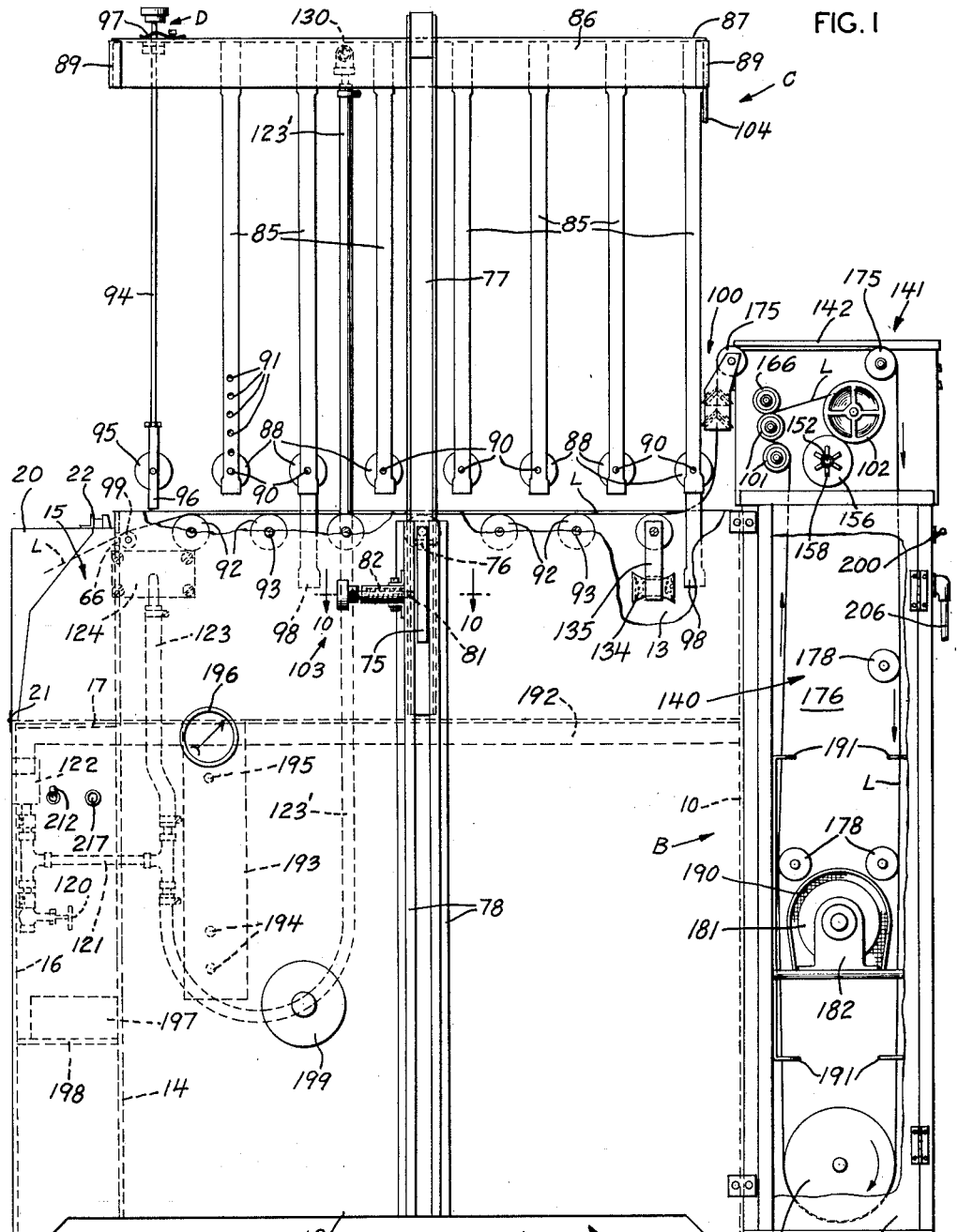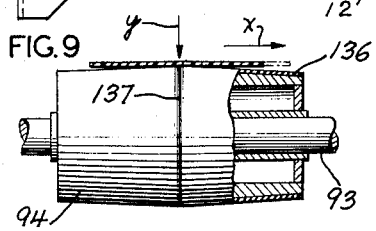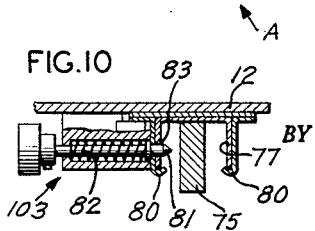

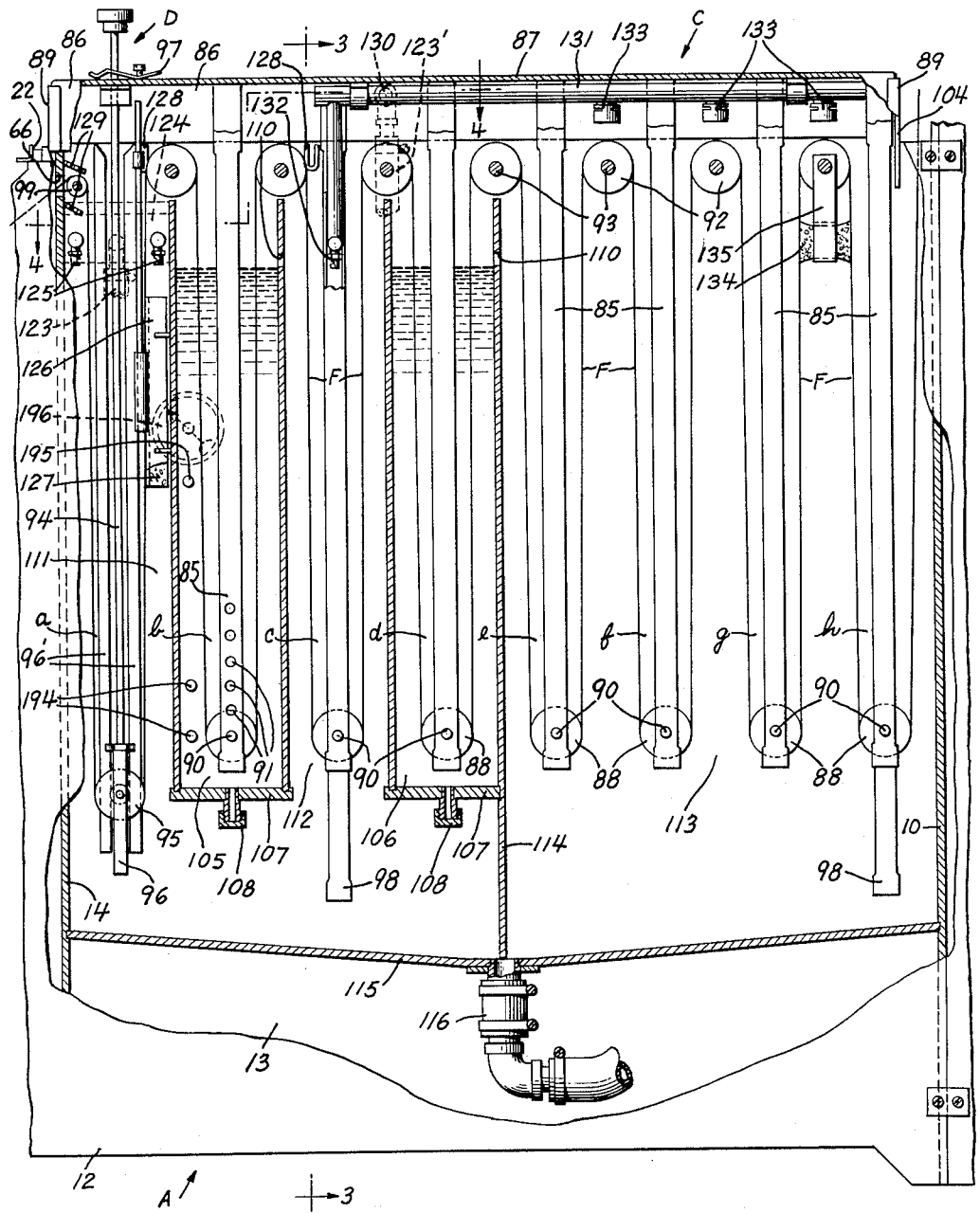

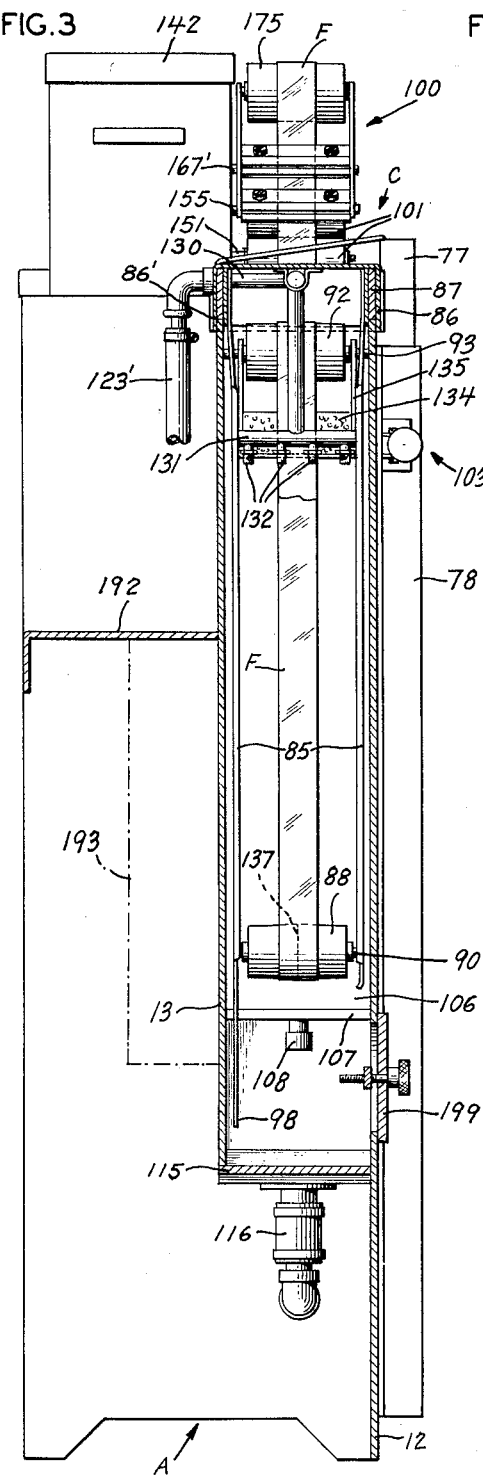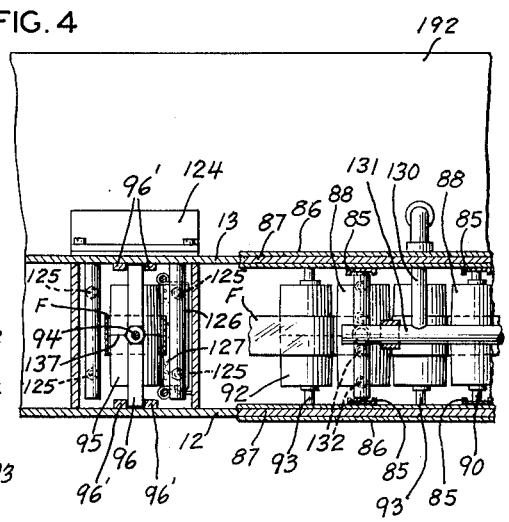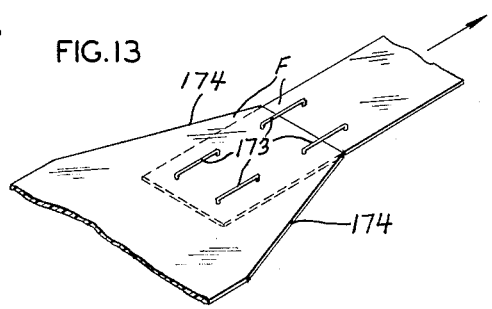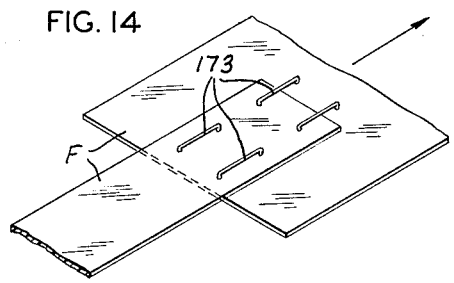

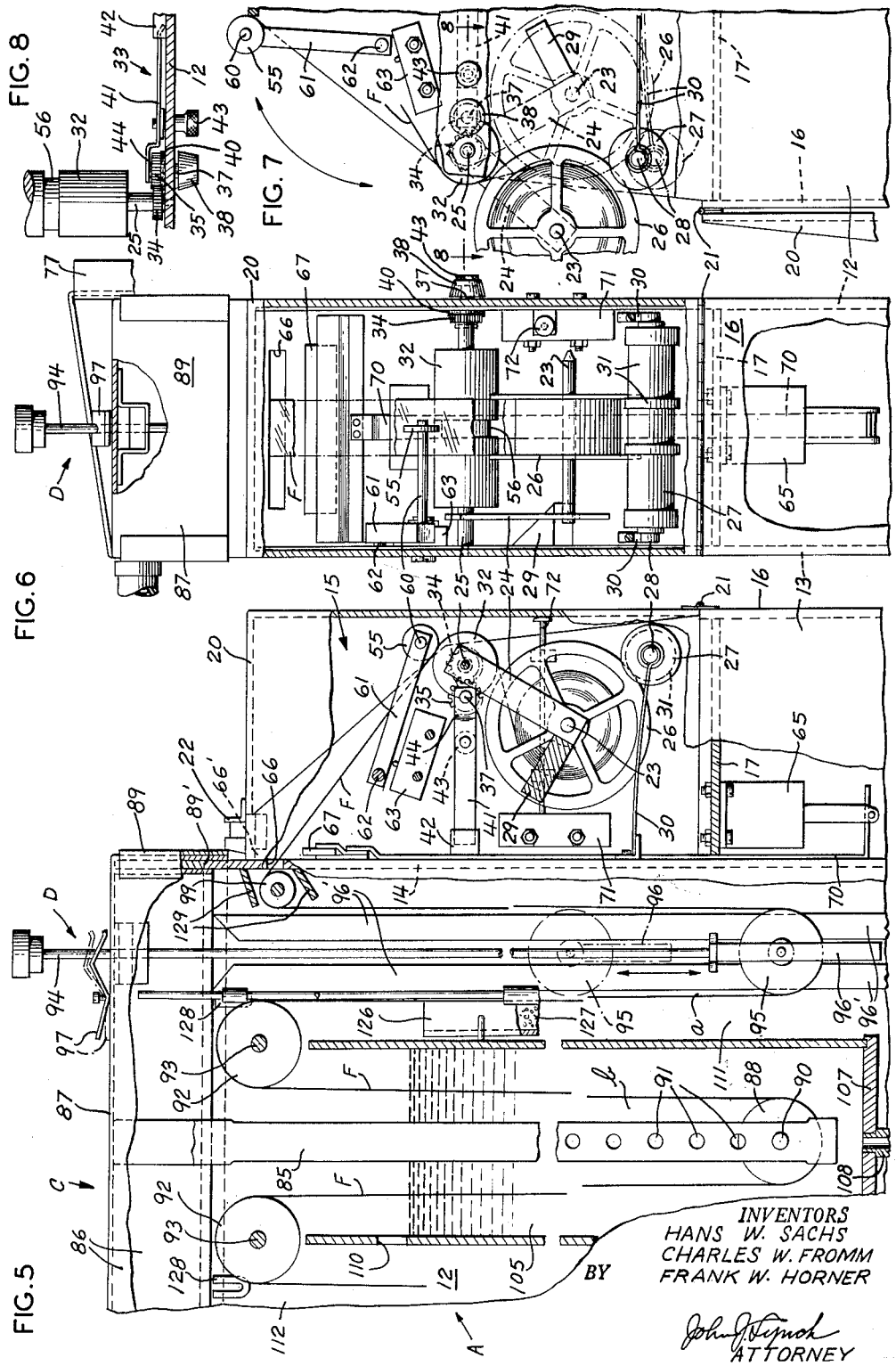

April 30, 1963 H. W. SACHS ET AL 3,087,405
FILM PROCESSING APPARATUS
Filed Dec. 21, 1959 7 Sheets-Sheet 5

INVENTORS
HANS W. SACHS
CHARLES W. FROMM
FRANK W. HORNER

BY John J. Lynch
ATTORNEY

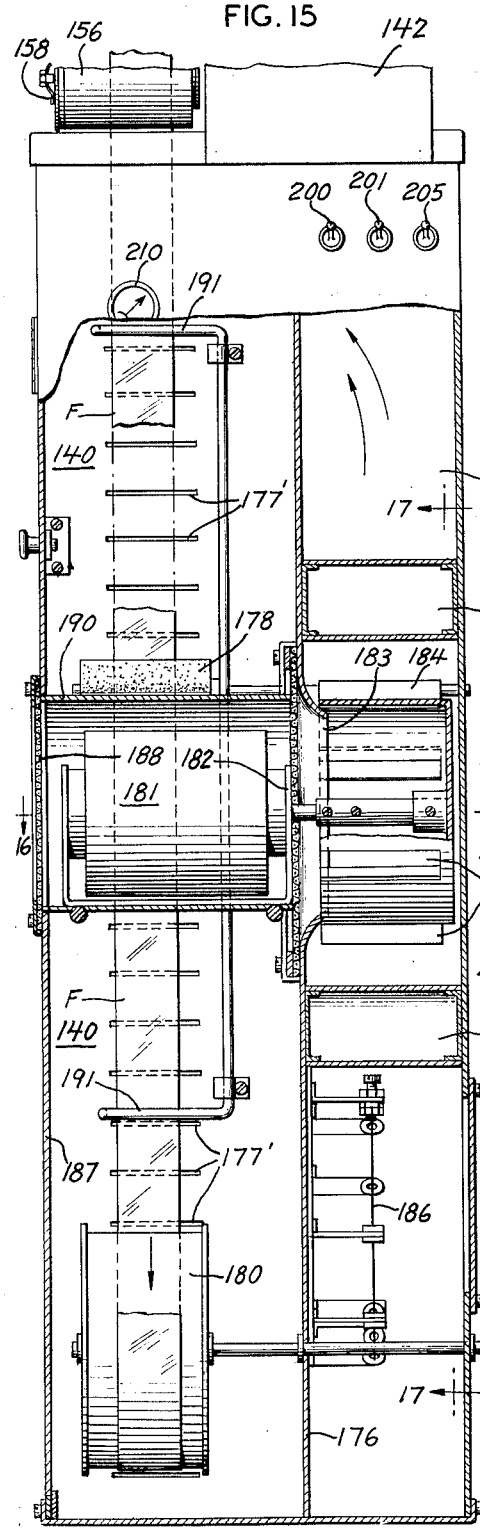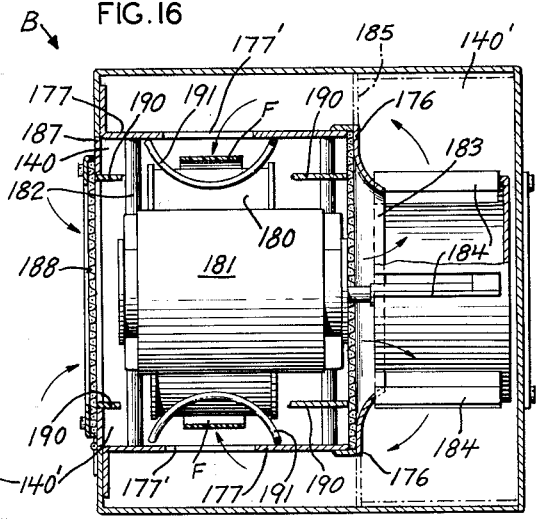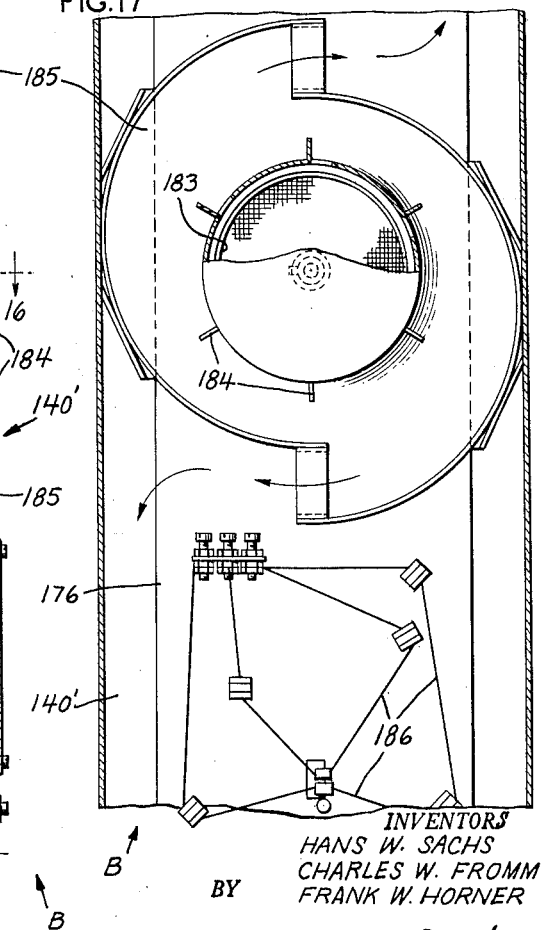

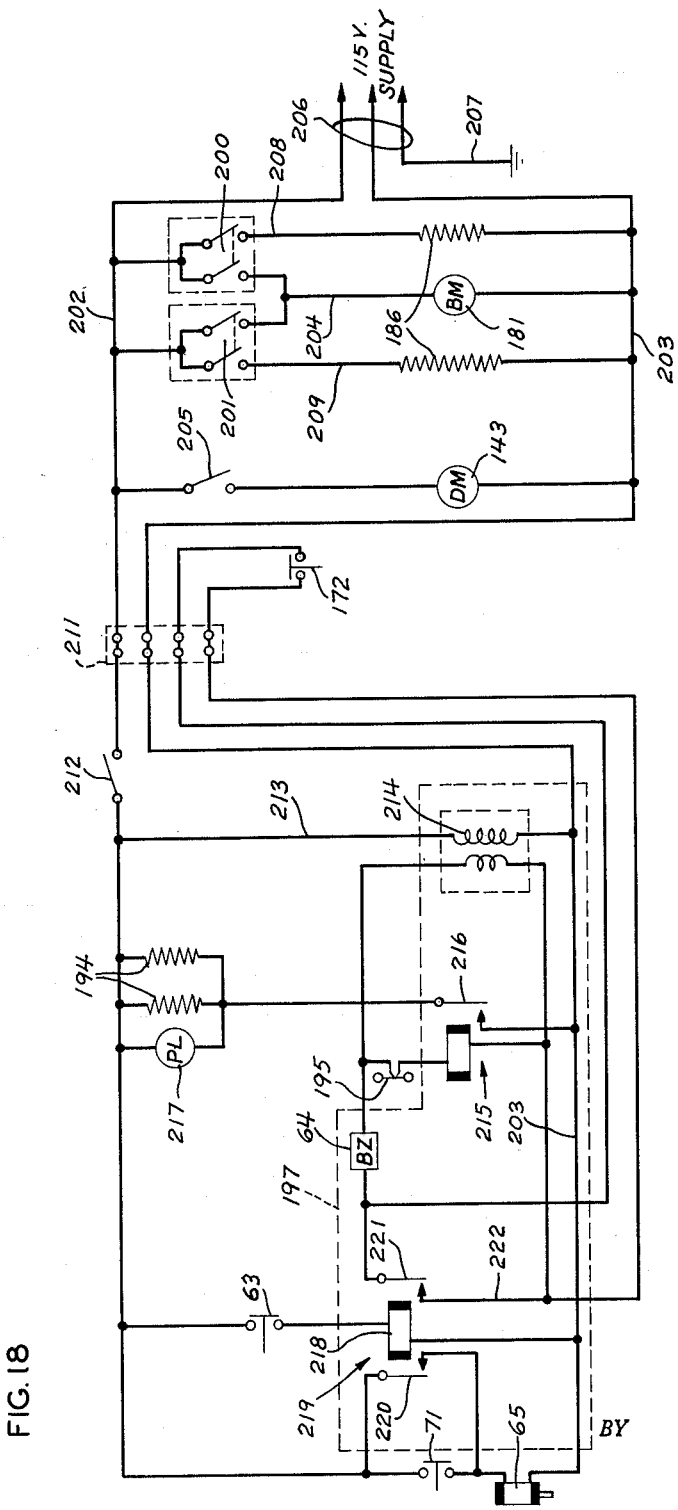

3,087,405
FILM PROCESSING APPARATUS
Hans W. Sachs, Binghamton, N.Y., Charles W. Fromm, Teaneck, N.J., and Frank W. Horner, Hollywood, Fla., assignors to Sperry Rand Corporation, New York, N.Y., a corporation of Delaware
Filed Dec. 21, 1959, Ser. No. 861,061
15 Claims. (Cl. 95—94)

This invention relates to improvements in photographic film processing machines which are employed for the continuous processing of motion picture film or microfilm. Particular emphasis is made to improvements in the film loading magazine, takeup mechanism, open loop web tensioning means, waste liquid disposal means and the film pull through feed mechanism.

In machines of this type, it has been the general practice to feed motion picture film or microfilm in closed loops generally known as helix loops, through a series of mechanically and electrically timed processing stages involving, dye-back removal, developer tanks, fixer tanks, rinse tanks, and wash tanks or sprays and driers. A great deal of ratioed gearing and intermittent delay timing is required to effect proper processing. Elaborate drainage systems are generally necessary employing a maze of piping, valves and pumps to assure proper run off of waste chemical liquids and wash water.

Preliminary lead threading and subsequent film tensioning is in some instances a hazardous procedure necessitating for the most part film sprocket rollers as employed with motion picture film and intermediary reel or roller driving means. Dark rooms are particularly essential for the protection of light sensitive film during threading and processing procedures necessitating opened partitions, covers, doors, etc.

It is the intention of this invention to simplify the film loading, threading and film takeup wherein all intermediate drives are eliminated and no dark room is required. A novel sump structure is employed for directing all waste to a unified drainage system.

One object of the invention is to provide for travel or flow of sensitized film of any size or width within design limits in an uninterrupted path from a loaded reel in the magazine of a film processor through successive stages of developing, washing and drying to a final takeup spool.

Another object of the invention is to provide a simple and efficient threading means for automatically arranging the sensitized film in a processor into an open-loop system for travel through the processor.

Another object of the invention is to provide a film processor with a light tight cover, enabling the complete processing of sensitized film without having to use a dark room.

Still another object of the invention is to provide means to facilitate the rapid mounting and removal of spools or reels of film without interruption of film travel either at the loading end or takeup end of the processor.

A further object of the invention is to provide for full interchangeability of various widths of film necessitating no interruptions nor mechanical adjustability of any kind of the film flow through the processor.

Further objects of the invention are: to provide a manual film web tensioning control, to provide a unified drain sump integral with the processor tank structure, and to provide a film driving mechanism for driving only developed set film, incorporating a slip clutch arrangement to frictionally drive a takeup reel at speeds commensurate with the amount of film wound on the reel.

Figure 12:
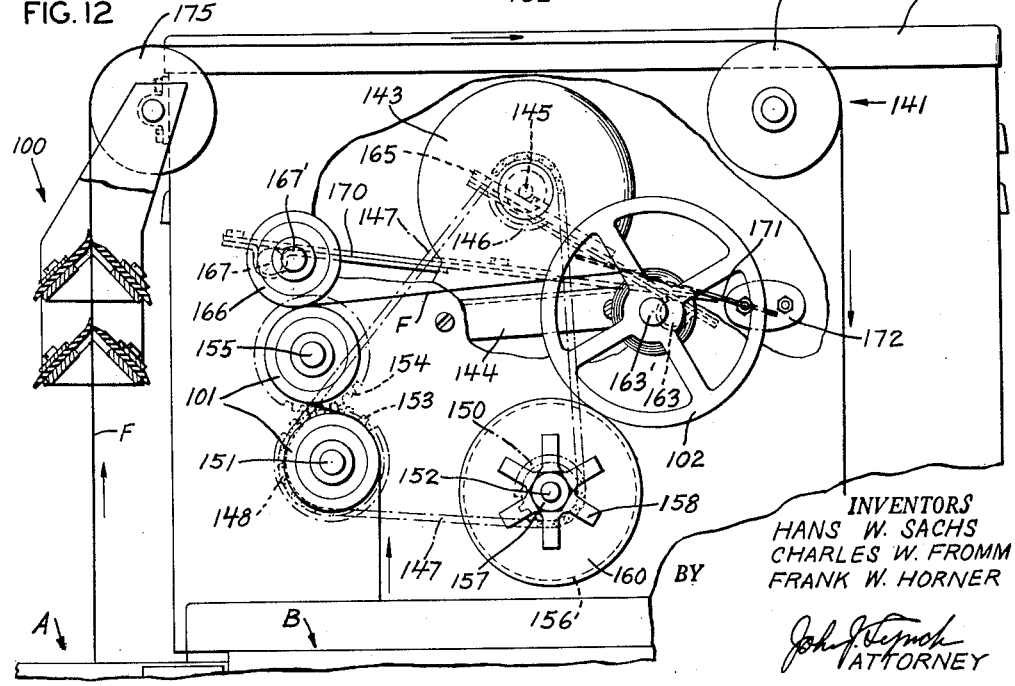

The present preferred form which the invention may assume is listed in the drawings in which, FIG. 1 is a view in front elevation of the processor showing a festooning device in elevated position, FIG 2 is an enlarged fragmentary elevation of the wet tank section of the processor a wall of which is partly broken away to show the inner details, FIG. 3 is a vertical cross section on line 3—3 of FIG. 2, FIG. 4 is a section along line 4—4 of FIG. 2, FIG. 5 is an enlarged fragmentary view in rear elevation illustrating the details of the loading chamber, FIG. 6 is a left end view of the loading chamber with the cover partially removed, FIG. 7 is a front view of the loading chamber with certain details shown in moved relation, FIG. 8 is a view taken on section line 8—8 of FIG. 7 showing the braking mechanism in detail, FIG. 9 is an enlarged detail view of a crowned roller, FIG. 10 is a section on line 10—10 of FIG. 1 illustrating the post lock in detail, FIG. 11 is a top plan view of the drive mechanism with certain details broken away, FIG. 12 is a view in front elevation of the drive mechanism with the motor housing partially broken out, FIG. 13 is an isometric view illustrating a film splicing technique, FIG. 14 is an isometric view showing a further film splicing technique, FIG. 15 is a right end elevation of the processor showing the dry box with a portion broken away, FIG. 16 is a section on line 16—16 of FIG. 15 showing the plenum chamber in particular, FIG. 17 is a section taken along lines 17—17 of FIG. 15 showing the air heating area of the dry box and, FIG. 18 is a wiring diagram showing the complete electric circuitry.

Referring more particularly to FIGS. 1 and 2 the general arrangement of the processor can be best defined by designating the main body portion or wet or fluid tank, as it is called in the art, by letter A. A dry box B of substantially the same height, but approximately twice the width of wet section A is positioned adjacent the right end wall 10 of said wet section A. A loop forming or festooning device C is disposed at the open top of tank A and is manually elevated or lowered as desired, as will be hereinafter described.

The wet or fluid tank A consists of a front wall 12 and a rear wall 13, FIG. 3, said walls serving, along with partition 14 and end wall 10, to form the basic area for the prerinsing, developing, rinsing, fixing and washing stages of the developing process. A film reel loading chamber 15 is located at the left end of the wet section A and is situated near the upper extremity of said wet tank between the partition 14 and the left end wall 16, a base panel 17 forming the bottom of the chamber. A door 20 constituting the upper left hand cover portion of the wet section and hinged as at 21 on the end wall 16, allows for easy accessibility to the interior of the chamber for purposes of loading, threading or splicing new film to the trailing end of a film being processed.

If it is desired to insert a reel or spool of exposed film, FIGS. 5, 6, and 7, the cover 20 is pulled out and down, against the pull of a magnetic latch 22 thereby exposing the loading mechanism in the chamber 15. A loading spindle 23, FIGS. 5 and 6, rigidly held at one end to freely swinging depending lever 24, which is pivoted at its upper extremity to a shaft 25, is swung outwardly to accommodate a reel 26. Said reel is preferably provided with approximately three feet of lead film to prevent exposing the sensitized film to direct light while the film splicing procedure is in progress.

No special locks, latches or stops are provided on the spindle 23 since the spool is automatically centered by a cradle roller 27 revolvably mounted on shaft 28 which in turn is journalled to the free ends at spaced spring arms 30 suitably secured to the partition 14, FIG. 5. The periphery of the roller 27 is shaped to present alternating ridges and grooves 31 so dimensioned and spaced that they can accommodate the circumferential surfaces of the flanges of any particular size film reel employed. For example, the particular cradle roller 27 which is used in this application can center spools or reels of film in any one of the existing three standards namely 16 mm., 35 mm., or 70 mm. widths. However, cradle rollers to accommodate film reels of other widths can be provided with fitting ridges and depressions and placed into the apparatus.

As the reel or spool 26, after being placed on the spindle 23 is pushed inwardly to the position shown in broken lines in FIG. 7, the flanges will bear against the surface of roller 27 pushing the latter downwardly against the pressure of spring arms 30 as shown in phantom in FIG. 7. The lever 24 will come to rest against stop block 29 allowing the cradle roller 27 to swing outwardly and upwardly around the periphery of the reel flanges thereby simultaneously centrally establishing the reel or spool 26 against the edges of the ridges and depressions axially and locking it against possible pulling out of its position. The pressure exerted on the cradle roller 27 by the spring arm 30 during film unwinding is sufficiently great to overcome the pull created on the reel by the film. It will be noted that no appreciable braking effect is created by the cradle roller 27 since it rotates freely by action of the flanges of the rotating spool against the periphery of said roller.

It is vital to avoid excessive tension in a film processor of this type. A minimum of tension must, however, be applied so that the travel will be controlled and poor unbalanced tracking or backlashing will be avoided. To accomplish this a holdback roller 32 is rotatable freely on shaft 25 over which the film F or leader L is threaded from the reel 26 to form a wrap of approximately 60 degrees over its periphery. Frictional action of the film against the highly resistant surface such as rubber forces the roller 32 to rotate in a clockwise direction as the film is pulled through, FIG. 7. To control the film tension throughout the apparatus a braking mechanism 33 is employed. A gear 34, FIG. 8, secured to shaft 25 inside of wall 12, meshes with a spur gear 35 keyed to a stub shaft 37, said shaft being journalled in front wall 12 at the right side of and parallel to shaft 25.

Shaft 37 has keyed to its outer extremity an indicator knob 38. A friction felt pad 40, encompassing shaft 37, is disposed between the gear 35 and inside of wall 12. A horizontal spring arm 41, anchored at its right end at 42, is held near its center in close proximity to the wall 12 by a thumb screw 43 and is offset at 44 to bear constantly against the face of gear 35. Adustments of thumb screw 43 are made to change the braking hold on gear 35 and roller 32 thereby permitting alterations on film tension in the apparatus.

After the end of the leader L leaves the spool and passes beyond roller 32, a warning will be given the operator by an audible buzzer alarm through the film brake mechanism. This is accomplished by the dropping of an alarm disc 55 into a peripheral slot 56 in the roller 32, FIGS. 6 and 8. This disc 55 normally rides on top of the travelling film directly above and in line with slot 56 by being freely rotatable on one end of a shaft 60 which extends from the free end of an arm 61 pivoted at 62 to the inside of rear wall 13. As the end of the leader leaves the roller 32, disc 55 will fall into the slot 56 and the lower surface of arm 61 will bear against the pin of a microswitch 63 closing a contact and thereby causing current to flow through and activate a buzzer alarm 64, FIG. 18, simultaneously energizing a film brake solenoid 65. The trailing end of the lead will be clamped into groove 66' on the chamber side of partition 14, FIG. 5, by a horizontal rubber blade 67 substantially of rectangular shape, larger than the film entrance slot 66 in partition 14 and serving to simultaneously cover said slot to prevent entry of any light into the wet tank A. The rubber blade is rigidly mounted to a vertical bar 70 which is slidably held by guides against the chamber side of partition 14. Said bar 70 is connected at its lower extremity to the plunger of the solenoid 65. It is apparent that, as the solenoid 65 is energized, the bar 70 and blade 67 will rise causing the film to be clamped into the groove 66' in the ceiling of the loading chamber. There is, however, no interruption of the film flow through the remainder of the processor as will be hereinafter explained.

The operator must presently open the chamber door 20 which action closes contact on a chamber door microswitch 71. Said microswitch is located on the front wall 12 and has an elongated plunger 72 in engagement with the door 20 which, when closed, holds the contact open. However, as the contact closes on opening the door, a secondary circuit is established for the brake solenoid 65 retaining the brake 67 in clamping position as long as the door remains open. In order to silence the buzzer the arm 61 is swung upward around pivot 62 to the position shown in FIG. 7 thereby opening the contact of switch 63 and deenergizing the buzzer 64. The empty spool is replaced by a new full spool or reel of sensitized film, the lead end of the new film is spliced to the trailing end of the lead film L, roller 55 is replaced over the film, the cover of the chamber is closed, thus closing contact of microswitch 71 which breaks the current to the solenoid 65, releasing the grip on the film and normal travel thereof is restored. Should it be desirous at any time to open door 20, microswitch 71 will automatically be closed thereby engaging brake solenoid 65 and braking film travel through slot 66. Manual pressure against plunger 72 will release the film from film brake 67 and permit the trailing end to travel into the wet tank A and consequently by pulled through the processor. These foregoing electrical circuits will become quite apparent if reference is made to the complete electrical system as shown in FIG. 18.

Prior to threading the lead from the loading chamber 15, through the film slot 66 and into the successive processing stages of the wet section A, the festooning device C must be raised as shown in FIG. 1. This is accomplished by manually lifting the hinged handle 75 which is pivotally secured at 76 to the lower extremity of channel iron post 77, FIG. 10. The post in turn rides in a vertical guide 78, centrally located on the outer face of front wall 12 and composed of two angle irons in parallel relation to one another, so spaced as to afford a sliding fit for the side flanges of post 77. The outer edges 80 of the angle irons, FIG. 10, are turned inwardly forming grooves to prevent the post from falling out. The guide 78 extends the full height of the front wall 12 and, after the handle 75 has been lifted to a point close to the top of the guide, a retractable pin 81, constantly urged against the flange of the post 77 by a spring 82, slides into a hole 83 in the flange causing the post and consequently the complete festooning device C to come to a halt, FIGS. 1 and 10. This action has exposed from within the wet section A a series of vertically depending and equidistantly spaced paired racks 85 each rack being secured respectively at its upper end to an inside surface of the front and rear aprons 86 of a cover member 87 of said festooning device C. Bottom rollers 88 are freely rotatable on shafts 90 journalled in the lower ends of each pair of racks 85.

The first pair of racks 85 depending from the left end of the cover 87 is provided with a series of vertically displaced adjustment holes 91 for the purpose of allowing the shifting of roller 88 to the required height on the racks. In this manner the length of the bite or loop of film in the developer tank is given the prescribed time allowance for exposure to the developing solution.

A second series of aligned, fixed top rollers 92 are freely rotatable on shafts 93 which are journalled in the upper ends of the front and rear walls 12 and 13. It is to be noted that the centers of this second series of rollers are so spaced as to be in staggered relationship to the centers of the overhanging rollers 88, the diameters of the rollers 88 and 92 are similar and of such dimensions that when the cover is lifted or lowered, the rollers will pass one another with a close clearance.

A tension response means or accumulator D composed of a slidable weighted guide post 94, vertically disposed at the left end of the cover 87, carries a yoke 96 and a roller 95 of similar shape and dimension as rollers 88 and 92 and rotatably journalled at its ends between two legs of a yoke 96. Said legs are slidably arranged in channels formed by spaced vertical bars 96' mounted on the inside of walls 12 and 13, FIGS. 2 and 4. A braking latch 97 secured to the top of cover 87 through which the post 94 passes, serves to maintain the post at any position of adjustment to allow the necessary action in connection with the film web tension control, to be hereinafter described.

It will be seen in FIG. 1 that when the festooning device C is in its uppermost position, latched in place by pin 81, there could be a tendency of the whole unit to sway or turn upon the channel post 77 due to the fact that no added channelled guide means is provided. This would be detrimental to further operation since the racks 85 and their respective rollers could not be replaced in their proper places upon the lowering of said festooning device C. To prohibit any sway or axial rotation two of the racks on the rear of the device are so lengthened as at 98 to remain inside and below the upper edge of the wet tank A in close proximity to rear wall 13. A triangle of stability is thus established between the two extensions 98 and the post 77 thereby preventing any axial sway and removing any hazard to an operator during film threading or receptacle solution replenishment operations.

With the cover 87 in raised position, the leader L, is pulled through the film slot 66, FIG. 2, over the top of roller 99, which is rotatably situated directly beyond said slot 66 inside the wet tank A, across rollers 92, through a squeegee arrangement 100, and successively encircling a series of rollers, to form a closed loop in the dry box B, and about a pair of film drive rollers 101, to be finally secured to the core of a takeup reel 102.

Prior to reinsertion of the festooning device into the wet section A the operator must observe the tension exerted on the leader by the braking mechanism 33 through the roller 32. It is imperative that the flow of leader, during the festooning or loop forming operation, is in no way impeded. If the setting of the braking mechanism 33 has not been readjusted prior to the threading of lead, tension adjustment will not be necessary. Should the tension be too great, however, the thumb screw 43 must be turned counterclockwise to relieve the pressure exerted against gear 35 to permit the shaft 25 to rotate reasonably freely.

To lower the cover, the handle 75 is gripped and the post 77 is released by retracting the pin 81 of cover post latch 103 against the action of spring 82. The festooning device C will then descend guided by the extensions 98 and the post 77 riding in channel 78. The bottom surfaces of rollers 88 will bear against the strip of leader, which has been spread across the tops of the rollers 92, and slowly drive said leader L down into the wet tank A between the rollers 92 and 99 forming festoons or open loops as seen in FIGS. 2 and 3. Since all rollers 88, 92 and 99 are freely rotatable the leader will be pulled off the load spool with little or no resistance. The descent of device C will terminate as the cover 87 comes to rest on the top edges of the wet or fluid section. The aprons 86 and left end 89 overlap respectively the front and rear walls 12 and 13 and upper edge of partition 14. A depending plate 104 at the right end of the cover 87 extends into the wet section for a short distance. It is evident that the cover 87 has thereby sealed off the entrance of any light during the film processing. During the threading procedure no sensitized film is employed since a reel or spool of lead containing approximately fifty feet of unsensitized lead film is placed on a spindle 23. After the threading is completed an ample supply of lead remains on said spool to which is spliced the lead end of sensitized film F. In this manner no light will affect a spool of sensitized film because the cover 20 after splicing operations, is closed prior to the reeling off of sensitized film into the processor. The rack or bottom rollers 88 have arrived at their lowermost positions and the completed open loops of film are situated in various places or stages in the wet tank A. Since the loops are to be treated individually they shall be referred to as loops $a$ through $h$.

Referring more particularly to FIGS. 2, 3, and 4 the wet or fluid section A has attached to the inner surfaces of its front and rear walls 12 and 13 a developer receptacle 105 and a suitably spaced fixer receptacle 106 in parallel relation to 105. Each of the receptacles 105 and 106 is of similar box like construction having the upper end open and a bottom 107 provided with a removable screw type drain plug 108. The developer receptacle 105 is so placed between the walls 12 and 13 as to freely accommodate the loop $b$ formed by the first left end rack roller 88 and the position of receptacle 106 is such that the third loop $d$ is freely suspended in the fixer solution. The bottoms of receptacles 105 and 106 are arranged at a distance which is below the peripheries of rollers 88 to allow clearance for passage of the film. Near the top edge of each receptacle is located an overflow hole 110 which at the same time limits the height of the solution in each receptacle. Loops $a$ and $c$ are suspended in bottomless bins or areas, the first of which, 111, is called the prerinse area and the second 112 a rinse area. Loops $e$, $f$, $g$, and $h$ all are suspended in one large wash area 113. A partition 114 formed by the depending continuation of a wall of fixer tank 106 is parallel to and approximately equidistant from the walls 10 and 14 to terminate at its lower edge at a pan 115 thereby sealing of all light to said receptacle 105 and 106 that enters from the upper right open end of the wet section. Said pan 115 completely encloses the lower portion of the wet tank to form a unified sump for solution and waste water drainage. A drain pipe coupling 116 is fixed at the point of union of the partition 114 and pan 115. The surface of the pan 115 converges to the drain to provide for gravity drainage. It is to be noted that no piping, valves or pumps are used in this installation and no water tanks are employed which require individual water temperature regulators and thermometers.

All washing is done by preheated spray water through a series of water nozzles arranged at the various spray areas. Referring more specifically to FIGS. 1, 2 and 3 the water system comprises a valve 120 and piping 121 connected thereto, said piping being mounted on the outside of rear wall 13 and being bypassed to terminate in a pressure guage 122 visible through a hole in the left end wall 16. A T-shaped branch leading toward the right end has connected to its two vertical T legs rubber hoses 123 and 123'. Hose 123 leads to a header 124 secured to the rear outside wall 13, near its upper edge, with a series of spray nozzles 125 aligned horizontally, extending through the wall 13 and into the prerinse area 111. This spray serves the prime purpose of wetting the film for removal of dyeback. The use of chemicals on the reverse or unemulsified side of certain photographic film is well known in the art and since this so-called dyeback must be removed during developing further provision is made by the insertion of bracket 126, to which is attached a rectangular sponge block 127, in slotted lugs 128, FIG. 5, fastened to the inside of walls 12 and 13. The sponge block is so situated that the dyeback or base side of the film in the prerinse area will constantly be rubbed against its face thereby creating sufficient friction to remove the remaining dyeback prior to the film entering the developer receptacle.

To prevent any water spray or vapor from entering the loading chamber 15 through film slot 66, baffles 129 are installed on the wet tank side of partition 14. The dangers of resultant corrosion of the mechanical parts and short circuiting of electrical components situated in the loading chamber is thereby averted.

The other hose 123' is of considerable length, the necessity for which is evident since it terminates at a header 130 secured to the underside of the cover 87, and due to the cover being raised at intervals the hose 123' must provide sufficient slack to compensate for the movement of the cover. Pipe 131 branches to a bank of spray nozzles 132 transversely situated in the cover approximately over the center of loop $c$ the nozzles being so directed that both surfaces of the film in loop $c$ are thoroughly covered. Certain films require dyeback removal in the rinse area 112 after leaving the developer receptacle 105. For this purpose, bracket 126 and sponge block 127 can be placed in similar lugs 128 in the rinse area 112 as shown in FIGS. 2 and 5. A second series of aerated water spray nozzles 133, feed by pipe 131, is constructed so that a nozzle is situated directly over each of three rollers 92 in the wash area 113. Loops $e$ through $h$ are irrigated by these spray nozzles 133. The use of aerated water spray nozzles in this apparatus has proven of definite value in that the aerated water has a tendency to cling to the surfaces of the film and actually run down the entire length of the strands of the loops without splash-off as regular spray jets do. This is very beneficial since the last remnants of chemical residue can be thoroughly irrigated from yards of film which are simultaneously under water treatment. To give the film a final dyeback and grit removing treatment, a second sponge block 134 is held in a bracket 135 which is pivotally suspended from shaft 93 between loops $g$ and $h$ but differing from the first block in that both surfaces engage the base side of the film as it travels up, over roller 92, and down again. Pivoting allows sponge block 134 to automatically center itself between film strands.

The aprons 86 and 89 of cover 87 aside from accomplishing a light impervious seal when placed on the top edges of walls 12 and 13 and partition 14, form a moisture proof seal thereon by an arrangement of overlapping gasketing 86' and 89' to prevent escape of any water vapor or droplets emanating from sprays 132 and 133.

It can be seen that throughout the entire wet tank flow of the web no film centering guides or sprocket wheels employed for motion picture film, are needed to hold the film centered on the rollers. Rollers 88 and 92, FIG. 9, are constructed with an outer surface of comparatively soft rubber 136 covering a core having its periphery slightly crowned in the center as at 137 and tapered conically to its ends. Dimensional variations at the roller periphery, warpage of the strand, the force of flowing water or water sprays, and also the force of air streams during drying, may produce reciprocal shifting of the film web relative to the roller surfaces over which it traverses. Helix loop arrangements, for example, produce a very pronounced one side shifting of a film strand from the point where the film first contacts the roller surfaces to the point of separation. These variations are unavoidable when the helix loop type of film travel is used. The open loop flow of the film in this processor diminishes lateral movement of the film strand over the rollers as indicated by arrow $x$, FIG. 9, contrary to troublesome shifting of webs in helix loop arrangements used in the art. Therefore, regardless of width, the film will invariably center itself, arrow $y$, FIG. 9, assuring unhampered travel of the web through the light sealed web tank.

Due to the fact that the film will loop around rollers 88 with its emulsion face next to the rollers, the rubber surfaces 136 of the rollers will have little or no tendency to mar or destroy the gelatine surfaces. Microscopic grit, always present during film developing and fixing, is very readily taken or absorbed into the soft resilient rubber surface rather than being forced against the film surface if it were in contact with a roller made of a harder substance such as plastic material. As the film leaves the roller, the grit will be thrown off by the elasticity of the rubber and will be washed away. Furthermore, eventual roughening of the surface of the rubber is almost nil due to its known abrasion resistance.

A film drive mechanism 141, situated on the dry box B, drives the completely developed and washed film through said dry box for final takeup on reel 102, FIGS. 11 and 12. An enclosure 142 houses a drive motor 143 mounted on a bracket 144 secured to the front wall of said enclosure 142. Shaft 145 of motor 143 has keyed thereto a sprocket wheel 146 which drives chain 147 over toothed wheels 148 and 150 mounted on shafts 151 and 152 respectively. Shaft 151 carries a spur gear 153 for meshing with a gear 154 on shaft 155 which is directly above and slightly to the left of the center of shaft 151. The protruding ends of shafts 151 and 155 have keyed thereto rubber covered film drive rollers 101, axially aligned with the rollers 88 and 92. Said rollers 101 are sufficiently spaced from one another to prevent the film from being excessively pressed which would obviously mar or damage the emulsion face. Referring to FIG. 9 it will be noted that rollers 101 are of identical construction with rollers 88 and 92 so that the film will constantly flow in one plane throughout the entire procedure. The shaft 152, parallel to shafts 151 and 155, extends through the front wall of enclosure 142 to loosely carry takeup reel drive drum 156.

Drum 156 comprises a slip clutch arrangement wherein a nut 157 on the threaded turned down end of shaft 152 bears against the finger spring 158 pushing disc 160, held by a sliding fit to shaft 152, against a friction pad 161 which in turn presses against the outer wall of drum 156. The opposite wall of the drum rubs against another friction disc and the entire unit is frictionally held against a disc 162 fixed to shaft 152, FIG. 11. The takeup reel 102 is loosely rotatable on an eccentric spindle end 163' of shaft 163 which extends parallel to shaft 152 and is journalled in the walls of the enclosure. A counterweight 165 fastened to the shaft 163 inside the enclosure serves to rock said shaft 163 in counterclockwise direction, forcing the periphery of the reel flanges against the slip proof rubber surface 164 of the drum 156, thereby insuring constant contact. As the film, during operation of the apparatus, is being fed the mounting weight of the takeup reel will have a tendency to retard the rotation of drum 156. The slip clutch, therefore, by virtue of the drum walls frictionally slipping against the two discs 161 will permit the drum to decelerate while the shaft 152 continues to be driven at normal drive speed. The eccentric end of the shaft permits rapid removal of a completely wound reel from the continuously rotating drum 156 by manually swinging the reel in a clockwise direction away from the drum, and replacement of a new reel. It is evident that, as stated before, the drum is constructed of sufficient width to accommodate a reel suitable for any size film up to its maximum width. Spindle end 163' as spindle 23, has no special locks, latches or stops, permitting free exchange of reels of various widths. Film or leader tracking over centers of crowned rollers 101 automatically centers reel 102. The traction between drive rollers 101 and the film does not depend on the pulling action of the takeup reel 102. The film will not slip on the drive rollers nor will the speed of travel be changed should the film be severed between the drive rollers and the takeup reel.

A splice alarm roller 166 freely rotatable on an eccentric spindle 167' of shaft 167, of similar construction to shaft 163, is placed directly above the upper of the two drive rollers 101 and centrally in line therewith. A long arm 170 attached near the opposite end of shaft 167, FIG. 11, extends toward the right to contact the underside of a bar 171 extending from the contact pin of a splice alarm microswitch 172. The arm 170 simultaneously carries a counterweight to force the roller 166 in a clockwise direction against the surface of upper roller 101. The film moving through the two rollers will have no effect on roller 166 until a splice appears in which two thicknesses of film plus the thickness of the staples 173, which bind the two ends, pass between the rollers. Since it is possible in this apparatus to interchange films of any width without interruption of film flow the film ends must of necessity be spliced in a precised manner, as shown in FIGS. 13 and 14. When splicing a wider film to the end of narrower one, the wide film must be tapered as at 174 so that its end will be identical with the width of the narrow film for the reason that any protruding edges could become bent upward or downward to cause jamming. The splicing of narrower film to wide film, however, requires no preparation since the trailing end of the wide film if curled up or folded offers no resistance to passage through the apparatus. Rollers 166 will be raise counterclockwise, FIG. 12, lifting long arm 170, which in turn will cause switch 172 to close thereby energizing the buzzer 64, FIG. 18, to give an audible alarm of warning to the operator that the end of a film has arrived and the reel must be removed.

The film, after passing through the self-centering squeegee 100 which squeezes the excess water from the film as it passes through its rubber blades, feeds over guide rollers 175, the left one of which carries loosely on its shaft the said squeegee and is fed into a film drying chamber 140 of dry box B, FIGS. 1, 12, 15, 16, and 17. A rear area 140' is formed in the dry box B by a partition wall 176 extending the full height of the dry box and being bent at right angles to form transverse walls 177 reaching to the outer wall of the dry box. This U-shaped rear area technically termed, a plenum area, is utilized to heat and circulate the air necessary for sufficiently and efficiently drying the film. The front area 140 encases the film which travels, after passing through slots in the cover of said area 140, in closed loop fashion, i.e. only the base or unemulsified surface is engaged by the rollers so as not to harm any of the gelatine on the face side prior to its being solidified by drying. The film traverses in the direction of the arrows, FIG. 1, buffer rollers 178 which serve the prime purpose of sponging up by their thick flannel coverings any last remnants of water spots to prevent any drying rings being left visible on the finished film. At the base of the area is centered a large freely rotatable drum 180 around which the film passes to extend over roller 178 and eventually pass between feed rollers 101.

Situated directly below the two horizontally centered rollers 178 and placed equidistantly between them is a shielded blower motor 181 mounted on a framework 182. The shaft of this motor extends through an axial funnel shaped orifice 183 integral with the partition 176, to have secured at its other extremity an air rotor or circulator 184. A helical air chamber 185, FIG. 17, with an upper and lower convolution surrounds the air rotor. It can readily be seen that the air will be forced downwardly and upwardly to circulate through the entire area. Directly below the helical air chamber are located the heating coils 186 to heat the air to thermostatically regulated temperatures. The two walls 177 are slit as at 177' for their entire heights, said slits 177' permitting entrance of the forced heated air to the front area to come into direct contact with the film surface. A cover 187, FIG. 16, seals the front area and also is provided with a filtering air inlet 188 directly in line with the motor for entry of raw air which cools the motor and passes through the tunnel formed by the shield 190 and directly into the plenum area by the suction force of the rotor. Exhaust of corresponding amounts of air takes place through film entering and leaving openings in top of heated chamber 140.

As a precautionary measure, to prevent any damage to the trailing end of a film while going through the dry box, guide loops 191, FIGS. 15 and 16 are installed on each of the walls 177. Said loops 191 are hinged to swing open permitting threading of film or lead. The loops serve the purpose of holding the film from backlashing and being hit against some obstruction which might mar or scratch the gelatine surface, prior to its complete solidification.

A shelf or platform 192 is horizontally located the entire length of and mounted to the rear wall of the wet tank A at approximately three quarters the height of said wet tank, as seen in FIGS. 1 and 3. Its width is the full width of the dry box B. This shelf serves as an appliance or servicing rack; as a partial cover for the piping and hoses of the water system; and as a splash protector for a switch box 193. The latter houses heating elements 194 and a thermoswitch or regulator 195 which protrude into the developer receptacle to respectively heat the developer solution and maintain the required temperature that can be read from thermometer 196 mounted in the front wall 12.

The control box 197, mounted at the left end of the wet tank FIG. 1 directly under the base panel 17 of the loading chamber 15 on sliding shelf 198, houses the majority of the electrical components which will be further referred to in the description of the electrical circuit as illustrated in FIG. 18.

A drain valve access door or hatch 199 is located on the front wall 12, FIG. 1, equidistantly spaced between the centers of the drain plugs 108. Manual removal of this cover permits insertion of a hand for removal of either or both drain plugs when it is desired to empty the receptacles of their solutions.

Following the aforementioned steps of film reel loading in the loading chamber, laying of the film across the top rollers 92, securing the film to the takeup reel 102, and lowering of the light tight cover 87 with its loop forming bottom rollers 88, the processor stands ready for mechanical operation. The operator turns on one of the two air heater switches 200 and 201 depending on the amount of heat required, FIG. 15. Referring specifically to FIG. 18, it will be seen, that either switch simultaneously provides current for the blower motor 181 through leads 202, 203, and 204. The air will commence to be heated and circulated. Drive motor switch 205 is then turned on and by virtue of drive rollers 101 will cause the film lead to be pulled through the apparatus.

The operator takes note of the speed of revolution of the indicator knob 38. Assuming that the amount of web tension is not enough to balance the weight of the tension response means or accumulator D the knob 38 will not turn. Turning the thumb screw 43 clockwise will increase the tension in the braking mechanism 33 so that the accumulator D starts to rise. The operator slowly reverses action on the thumb screw 43 until the accumulator stops rising. At this point proper web tension has been attained. The operator releases latch 97, as indicated in phantom in FIG. 5, manually recedes the accumulator to normal operating position whereupon roller 95 will remain at an elevation somewhat higher than its lowermost position thereby establishing a full loop *a* for any subsequent film addition. Indicator knob 38 will rotate counterclockwise at the same rate of speed as the film travels through the processor. The accumulator D will remain indefinitely in this operational position since the film tension pull is not great enough to overcome the weight of the accumulator nor will the automatic gripping action of latch 97 permit its descent.

Should the buzzer alarm 64 be sounded, the operator will note that the indicator knob 38 has stopped rotating. The end of the film has left its reel or spool 26 as hereinbefore described and is clamped by film brake 67. The film loop *a* carries the accumulator D, increasing the film tension in proportion to the tension in normal operation. Since the film end is held fast by the brake 67 and the drive rollers 101 continue to drive without any film stoppage the accumulator must rise. After completion of splicing which must be done prior to the termination of rise of accumulator D, the operator releases latch 97 manually, allowing the accumulator to gradually descend by friction and reforming loop *a* to its normal length. The speed of film reel or spool 26 and knob 38 will, during this action, be accelerated because more film is being added to loop *a*.

Should wear of any parts of the mechanism 33, let the tension fall below normal, the knob 38 will decrease in speed thus indicating to the operator that he must turn screw 43 clockwise to reestablish the proper tension as previously explained.

Rising of the accumulator D will indicate to the operator that due to faulty bent flanges of the reel 26, the film is being abnormally held thereby increasing the braking action to affect a shortening of the loop *a*. A counter-clockwise turn on screw 43 relieving braking, will restore the speed of film travel to normal.

The braking mechanism 33 serves to control the web tension throughout the apparatus. No other adjustments are required since no further intermediate film driving means are employed. Inasmuch as film and paper strands will expand when immersed in liquids and will keep expanding frequently at different rates, when travelling from roller to roller, compensating means must be provided, in processors equipped with drive rollers, at various locations throughout the wet section. Drying, however, where contracting of the strands occurs, necessitates further provisions of drive speed regulation in apparatuses having intermediate driving means. Much misfunctioning due to wear, sludge, foreign particles, etc. and complication of drives has been a detriment to processors of this type having multiple or intermediate driving means. The web tension control of this invention permits elimination of all compensating means during wet tank processing and during drying until all expansion and contraction is balanced by permitting all the rollers in the apparatus which, with the exception of rollers 101, are free to turn in synchronization with the speed of the film passing over them.

It is to be noted that due to the high coefficient of friction or traction inherent in the rubber coverings of drive rollers 101, no slippage occurs even if the tension in the web should reach a multiple of that for normal operation.

The electric circuits pertaining to the proper function of the apparatus can best be followed if reference is made to the wiring diagram FIG. 18. A three wire cable 206 leads from a 115 v. supply source with one wire 207 going to ground. The positive and negative leads 202 and 203 are in parallel. A low heat bi-pole switch 200, when closed, supplies current to an air heating element 186 in the plenum area 140' by lead 208 and through lead 204 turns on blower motor 181. If a higher degree of heat is required switch 200 can be turned off and high heat switch 201 is turned on, supplying through lead 209 current to an air heating element 186 of greater size similarly located in the air heating or plenum area 140', and through lead 204 to motor 181 which drives air into the said air heating area of the dry box B. Should more heat be necessary, then both switches 200 and 201 can be switched on thus increasing the heating capacity. A thermometer 210 mounted to the right end of the dry box will indicate temperature ranges.

To start the apparatus or film drive, switch 205 is closed supplying current to film drive motor 143. These three toggle switches 200, 201 and 205 are situated on the right end wall of the dry box, FIG. 15.

After passing through a terminal block 211 the two leads 202 and 203 continue with lead 202 interrupted by a toggle main switch 212 which, when in open position, prohibits current from flowing to any of the components in the wet section or loading chamber. When, however, the switch 212 is closed current will be supplied through lead 213 to a transformer 214 to lower the voltage to operate a developer thermoswitch 195 and delay relay 215. If the temperature of the developer liquid is too low contact 216 of relay 215 will close supplying current through leads 202 and 203 to the heaters 194 and to a pilot light 217 mounted to the front wall of the wet tank. It is obvious that the light, FIG. 1, is visible only when the heaters are on and goes off when contact 216 is broken.

The buzzer alarm circuits comprising switches 63 and 71 and film brake solenoid 65, in conjunction with the buzzer alarm 64, have been hereinabove explicitly described. It is to be noted, however, that a magnet 218 of relay 219, when energized by the closing of microswitch 63, pulls in two springs 220 and 221 energizing buzzer 64 through spring 221, and brake solenoid 65 through spring 220. When the loading chamber door is opened switch 71 closes and will keep solenoid 65 energized even though microswitch 63 is opened.

It may be desirable for some installations to provide an apparatus with a timing control to preheat the developer liquid so that operation can begin at a designated time. A three way switch may be used in place of switch 212, an alternate contact of such three-way switch serving to connect lead 202 to the contact points of a clock switch which can be used to turn the apparatus on and off automatically.

While there have been shown and described the fundamental novel features of the invention, as applied to a preferred embodiment, it will be understood that various omissions, substitutions and changes, in the form and details of the device illustrated and in its operation, may be made by those skilled in the art without departing from the spirit of the invention.

What is claimed as novel is:

1. An apparatus for processing a reel of film having a lead portion insensitive to light; comprising a fluid tank partitioned to provide separate fluid chambers; spaced rollers fixedly mounted laterally in the upper part of said tank; film supply means at one end of the tank including a spindle to accommodate a supply spool; spool centering means; a feed control roller having a peripheral groove thereon, said roller coacting with said spool centering means to retain said spool on said spindle; supply control means in coacting relationship with said roller to regulate the feed of the film at the supply end, and film brake means for stopping the film end from entering the said fluid tank; film takeup means at the other end of the tank, said fixed rollers supporting the lead portion of said film between the supply and takeup means; a cover forming a light proof closure for the top of the tank and mounted for vertical movement; spaced movable rollers suspended from said cover extending laterally thereof and arranged to be positioned above and centrally of said fixed rollers when the cover is in open raised position and arranged to form depending loops in the film between the fixed rollers when the cover lowers to closed position; and web tension controlling means for regulating the feed of film from the supply means to the takeup means.

2. The apparatus as set forth in claim 1 wherein said fixed rollers are disposed above said partitions and the depending loops formed by said movable rollers are disposed in separate chambers formed by said partitions.

3. The apparatus as set forth in claim 1 wherein said film brake means includes pivoted disc means aligned with the groove in said roller and normally riding on the film as the latter passes over said control roller; an end partition in said tank having an orifice through which the film passes to said fluid tank; braking means including a brake blade movable to grip the film at the orifice; and circuit controlled means operated by the movement of said disc entering said groove after the end of a film has passed from under said disc, forcing said brake blade over said orifice to clamp said film end.

4. The apparatus as set forth in claim 1 including a roller for maintaining a loop of predetermined extent in the film; means for supporting the roller from said cover for rising movement independently of said cover when said supply control means decreases the extent of said loop; means for adjusting the operation of said supply control means to increase the feed of the film to enlarge said loop; means for holding the roller at any position of rising movement; and said holding means being adjustable to lower said roller to reengage the film.

5. In a photographic film processing apparatus, the combination of a receptacle including a fluid tank; a light proof cover means for said tank; means for raising and lowering said cover means; spaced tank roller means in the upper end of said tank; spaced cover roller means depending from said cover means and coacting with said tank roller means when the cover is lowered to form film festoons in said tank; film loading means located at one end of said tank and including a film gripping brake means, a swingable spindle for mounting a film spool, yieldably suspended spool centering roller means; and a roller diametrically opposed to and coacting with said roller means to rotatably retain said spool on said spindle; film drying means disposed at the opposite end of said processing tank; film feeding means to which the film passes from said drying means, film takeup means to which the film passes from said film feeding means; and circuit means for controlling the movement of the film from said loading means to said film takeup means.

6. The apparatus as claimed in claim 5 in which said film drying means includes a film traversing area; a vertical transverse partition in said area; an air heating area formed by said partiton; air heating means; air turbulence means for circulating the heated air in said heating area; and said partition being formed to provide air release slits to convey the forced heated air toward the film in said film traversing area.

7. The device as claimed in claim 6 wherein said circuit means includes first switching means for closing a circuit including said air heating means and said air turbulence means; second switching means in the circuit means for energizing said film feeding and takeup means; third switching means in the circuit means; transformer means in circuit with said third switching means; fluid heating means in said circuit means; thermo switching means for regulating the temperature of said fluid heating means; relay means biasing said transformer and third switching means; film end warning means in circuit with said relay means; film brake operating means in the circuit controlled by said relay means; and full spool indicating means in circuit with said film end warning and said relay means.

8. The device claimed in claim 7 wherein said first switching means includes auxiliary switching means for increasing the heating capacity of said air heating means.

9. The apparatus as claimed in claim 5 in which said means for raising and lowering said cover means includes perpendicular guide rails; post means depending from said cover and slidable in said guide rails; and means at the upper end of said guide rails for automatically latching said cover in elevated position.

10. The apparatus as claimed in claim 5 wherein said spool centering roller means includes a plurality of annular ridges and channels on said roller providing shouldered edges for automatically centering film spools of different widths by abutment of the flanges of said spools with said shouldered edges.

11. The apparatus as claimed in claim 5 in which said film feeding means includes a motor; drive conveying means; and a plurality of soft surfaced spaced film drive rollers driven by said drive conveying means, said drive rollers feeding the film from said film drying means.

12. A photographic film processor, comprising a receptacle including a fluid section; light proof cover means on said fluid section; means for raising and lowering said cover means; film supply means at one end of said receptacle; film spool centering means associated with said film supply means; film feeding means at the opposite end of said fluid receptacle; film takeup means including a takeup reel associated with said film feeding means; a film drum driving said takeup reel; slip clutch means for velocity compensation of said drum; spaced film support rollers in the upper part of said fluid section; spaced movable rollers carried by said cover and disposed intermediate said support rollers for forming film loops between said support rollers in said fluid section; film tension response means on said cover; a film roller mounted on an end of said film tension response means for vertical movement, independently of said cover; film control means in said receptacle for regulating the flow of film from the supply means to the takeup means, said tension response means coacting with said control means for adjusting the film tension; partition means in said fluid section providing separate liquid chambers; partition means in said section providing separate wash areas; film spraying means in said wash areas; a drainage sump in said fluid section common to all of said liquid chambers and wash areas; means associated with said sump for draining all waste solutions; film drying means at one end of said fluid section; air heating and turbulence means associated with said film drying means; and means for travelling the film through said film drying means.

13. A film processing apparatus comprising a fluid tank; spaced support rollers extending laterally of the tank at the upper end thereof; film supply means at one end of the tank; film takeup means at the opposite end of the tank, the film passing over said support rollers between the supply and takeup means; a light proof cover mounted for vertical movement on the tank; said fluid tank including a plurality of transverse partitions; a plurality of processing areas defined by said partitions; horizontal closure members located at the base of said areas and forming receptacles for the retention of chemical fluids; a plurality of irrigation areas formed by said partitions and arranged in staggered spaced relationship with said processing areas; a first irrigation means for spraying the film in said irrigation areas; a central transverse partition forming an irrigation chamber opposed to said irrigation areas; a second irrigation means on said cover for spraying the film in said irrigation areas; a third irrigation means on said cover for wetting the film in said irrigation chamber; a single drainage sump at the base of said fluid tank common to all of said irrigation areas and fluid receptacles; and drainage means in said sump for draining off all waste solutions; spaced looping rollers suspended from said cover extending laterally thereof and arranged to be positioned above and centrally of said support rollers when the cover is in open raised position and arranged to form depending loops in the film between said support rollers when the cover is lowered to closed position; means for mounting one of said looping rollers for vertical movement independently of the cover to provide a film tension response means when the supply end of the film is rendered immovable; and circuit means for controlling the operation of said supply and takeup means.

14. A film processing apparatus comprising a fluid tank; spaced support rollers extending laterally of the tank at the upper end thereof; film supply means at one end of the tank; film takeup means at the opposite end of the tank, the film passing over said support rollers between the supply and takeup means; a light proof cover mounted for vertical movement on the tank; spaced looping rollers suspended from said cover extending laterally thereof and arranged to be positioned above and centrally of said support rollers when the cover is in opened raised position and arranged to form depending loops in the film between said support rollers when the cover is lowered to closed position; means for mounting one of said looping rollers for vertical movement independently of the cover to provide a film tension response means when the supply end of the film is rendered immovable including a rod slidable in said cover; journalling means for said roller disposed on one end of said rod; manually releasable latching means on said cover for holding said rod at vertically adjusted positions; and circuit means for controlling the operation of said supply and takeup means.

15. In a photographic film processing apparatus, the combination of a receptacle including a fluid tank; a light proof cover means for said tank; means for raising and lowering said cover means; spaced tank roller means in the upper end of said tank; spaced cover roller means depending from said cover means and coacting with said tank roller means when the cover is lowered to form film festoons in said tank; film loading means including a film gripping brake means located at one end of said tank; film drying means disposed at the opposite end of said processing tank; film feeding means to which the film passes from said drying means; film takeup means including a takeup reel to which the film passes from said film feeding means; said film takeup means including a motor; drive means operated by said motor; a shaft driven by said drive means; a drum on said shaft; slip clutch means on said drum; a rockable spindle forcing said takeup reel against said drum, said clutch being arranged to slip for varying the speed of rotation of said drum relative to its shaft as pressure from the load on the takeup reel against the surface of said drum increases; and circuit means for controlling the movement of the film from said loading means to said film takeup means.

References Cited in the file of this patent
UNITED STATES PATENTS

| 1,965,504 | Macron | July 3, 1934 |

FOREIGN PATENTS

| 18,852 | Great Britain | 1913 |
| 443,581 | Great Britain | Mar. 2, 1936 |